United States Patent
Haughawout et al.

(10) Patent No.: US 7,760,907 B2
(45) Date of Patent: *Jul. 20, 2010

(54) SYSTEM AND METHOD FOR USING IMAGE DATA IN CONNECTION WITH CONFIGURING A UNIVERSAL CONTROLLING DEVICE

(75) Inventors: Joseph Lee Haughawout, Aliso Viejo, CA (US); Patrick H. Hayes, Mission Viejo, CA (US)

(73) Assignee: Universal Electronics Inc., Cypress, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/633,125

(22) Filed: Dec. 8, 2009

(65) Prior Publication Data
US 2010/0134318 A1    Jun. 3, 2010

Related U.S. Application Data

(62) Division of application No. 11/437,251, filed on May 19, 2006, now Pat. No. 7,653,212.

(51) Int. Cl.
*G06K 9/00* (2006.01)
(52) U.S. Cl. .................... 382/100; 348/734; 725/37
(58) Field of Classification Search ............ 382/100
See application file for complete search history.

(56) References Cited

U.S. PATENT DOCUMENTS

| | | | |
|---|---|---|---|
| 5,959,751 A * | 9/1999 | Darbee et al. ............... 398/112 |
| 6,211,856 B1 * | 4/2001 | Choi et al. .................. 345/666 |
| 7,046,161 B2 * | 5/2006 | Hayes ...................... 340/825.69 |
| 7,590,310 B2 * | 9/2009 | Retterath et al. ............ 382/305 |
| 7,610,555 B2 * | 10/2009 | Klein et al. ................. 715/738 |
| 7,653,212 B2 * | 1/2010 | Haughawout et al. ....... 382/100 |
| 2001/0017615 A1 * | 8/2001 | Lin et al. .................... 345/173 |
| 2001/0045819 A1 * | 11/2001 | Harris et al. ................ 323/371 |
| 2002/0143805 A1 * | 10/2002 | Hayes et al. ................ 707/500 |
| 2003/0095156 A1 * | 5/2003 | Klein et al. ................ 345/864 |
| 2003/0103088 A1 * | 6/2003 | Dresti et al. ............... 345/835 |
| 2003/0141987 A1 * | 7/2003 | Hayes ...................... 340/825.72 |
| 2003/0189509 A1 * | 10/2003 | Hayes et al. ............... 341/176 |
| 2004/0003001 A1 * | 1/2004 | Shimura .................. 707/104.1 |
| 2004/0070491 A1 * | 4/2004 | Huang et al. ............... 340/10.5 |
| 2004/0257259 A1 * | 12/2004 | Jindal ........................ 341/176 |
| 2007/0080845 A1 * | 4/2007 | Amand ...................... 341/176 |
| 2007/0217650 A1 * | 9/2007 | Ota et al. ................... 382/100 |
| 2009/0123025 A1 * | 5/2009 | Deng et al. ................ 382/100 |

* cited by examiner

*Primary Examiner*—Sath V Perungavoor
(74) *Attorney, Agent, or Firm*—Greenberg Traurig, LLP

(57) ABSTRACT

A user provides to an image recognition system an image that is intended to be used to identify one or more appliances that are to be controlled by a universal controlling device. The image recognition system has access to a database of images that have been cross-referenced to appliances and configuration information for those appliances. The image recognition system uses the provided image to identify one or more appliances to be controlled using the universal controlling device and, accordingly, the configuration information for those one or more appliances so identified. The configuration information may then be provided to a user for manual provision to the universal controlling device or be provided in a form for downloading into the universal controlling device, whether directly or via an intermediate device. The configuration information may also be provided to an intermediate device which has programming for use in connection with a process of configuring the universal controlling device.

4 Claims, 8 Drawing Sheets

SYSTEM AND METHOD FOR USING IMAGE DATA IN CONNECTION WITH CONFIGURING A UNIVERSAL CONTROLLING DEVICE

RELATED APPLICATION DATA

This application claims the benefit of and is a divisional of U.S. application Ser. No. 11/437,251, filed on May 19, 2006, which application is incorporated herein by reference in its entirety.

BACKGROUND

Universal controlling devices, for example, remote controls, which are adaptable to issue commands to a multiplicity of appliances of different type and/or manufacture, and the features and functionality provided by such controlling devices are well known in the art. In this regard, early universal controlling devices such as described in U.S. Pat. No. 4,623,887 were generally "learners," that is, they were adapted to capture, store, and subsequently play back the command signals of the original equipment remote controls corresponding to the appliances to be controlled. However, the required initial teaching process used to configure such early universal controlling devices proved tedious and error prone.

To address this drawback, further universal controlling devices were introduced which included preprogrammed libraries of command code sets, such as those described in U.S. Pat. No. 4,774,511 or 4,959,810. As particularly described in U.S. Pat. No. 4,959,810, to configure such a universal controlling device a user is required to consult a reference manual or the like to obtain a setup cock that corresponds to an intended target appliance. The setup code is then keyed into the universal controlling device where it is used to select a command code set from the library of command code sets stored in the universal controlling device whereupon the selected command code set is to be used when the universal controlling device is instructed to issue commands to that intended target appliance.

As alternatives to a user looking up a setup code and manually keying the setup code into the universal controlling device for the purpose of configuring the universal controlling device, U.S. Published Application Nos. 2006/0050142, 2004/0070491, and 2003/0189509 and U.S. Pat. Nos. 6,225, 938 and 6,157,319 illustrate and describe using information from, for example, an RFID tag, bar code, appliance generated signal, user interaction with a locally displayed or remotely (e.g., computer or Internet) accessible menu, etc. to identify the appliance intended to be controlled which information is accordingly used to select a in command code set from a library of command code sets to be used when sending commands to that appliance. As further described in these references, the library of command codes sets may be stored locally on the universal controlling device or in a database accessible to the universal controlling device where the selected command code sets are thus downloaded into the universal controlling device. As additionally described in these references, the information used to identify one or more intended target appliances may also be used to configure a macro command sequence to command operations of the one or more appliances, to configure a user interface for the universal controlling device in a manner that is also applicable to the appliance(s) to be controlled, etc.

Still further, universal controlling devices are known that allow a user to key into the universal controlling device information that is used to configure the universal controlling device to command additional operations of an intended target appliance. One such universal controlling device is described and illustrated in U.S. Pat. No. 5,515,052. A yet further system and method for configuring a universal controlling device to command operations of an intended target appliance is described and illustrated in co-pending U.S. application Ser. No. 11/389,627, entitled "System And Method For Defining A Controlled Device Command Set," filed on Mar. 24, 2006.

It is also known in the art to configure a universal controlling device to thereby provide to the universal controlling device a user interface that has the same appearance as the original equipment remote control corresponding to the appliances to be controlled. For example, U.S. Pat. No. 6,938, 101 illustrates and describes a universal controlling device that provides a user interface in the form of a virtual remote control that has the key layout and appearance of an original equipment remote control. Similarly, PCT Published Application WO 2005/043484 illustrates and describes a universal controlling device having a camera where the camera is used to capture an image of an original equipment remote control which captured image is then used in the user interface of the universal controlling device.

While these variously known systems and methods for configuring a universal controlling device generally work for their intended purpose, a need remains for a system and method that provides a yet more convenient and user friendly way for configuring a universal controlling device.

SUMMARY OF THE INVENTION

In accordance with this and other needs, the following generally describes a system and method for using image data in connection with a process for configuring a universal controlling device. To this end, a user provides to a system an image that is intended to be used to identify one or more appliances that are to be controlled by the universal controlling device. The image may be an image of the appliance itself, of an original equipment remote control for the appliance, of a bar code associated with the appliance, of packaging for the appliance, of a catalog or user manual page or illustration, or any other type of imagery which functions to identify the appliance intended to be controlled. More particularly, the image is provided to an image recognition system having access to a database of images that have been cross-referenced to appliances and configuration information for those appliances. In this regard, configuration information may be one or more pointers to data, such as data stored on the universal controlling device, a computing device capable of communicating with the universal controlling device, etc. and/or data itself. The image recognition system may use the provided image to identify one or more appliances to be controlled using the universal controlling device and, accordingly, the configuration information for those one or more appliances so identified. The configuration information may then be provided to a user for manual provision to the universal controlling device or be provided in a form for downloading into the universal controlling device, whether directly or via an intermediate device. The configuration information may also be provided to an intermediate device which has programming for use in connection with a process of configuring the universal controlling device. In any of these cases, the configuration information may be used to select or create one or more command code sets for configuring the universal controlling device to command operations of one or more appliances, select or create one or more commands for configuring the controlling device to command operations of one or more appliances, such as extended operations, select or create user interface elements, user interface pages, etc. for use on the universal controlling device, provide mappings between one or more commands and one or more user interface elements of the universal controlling device, etc.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
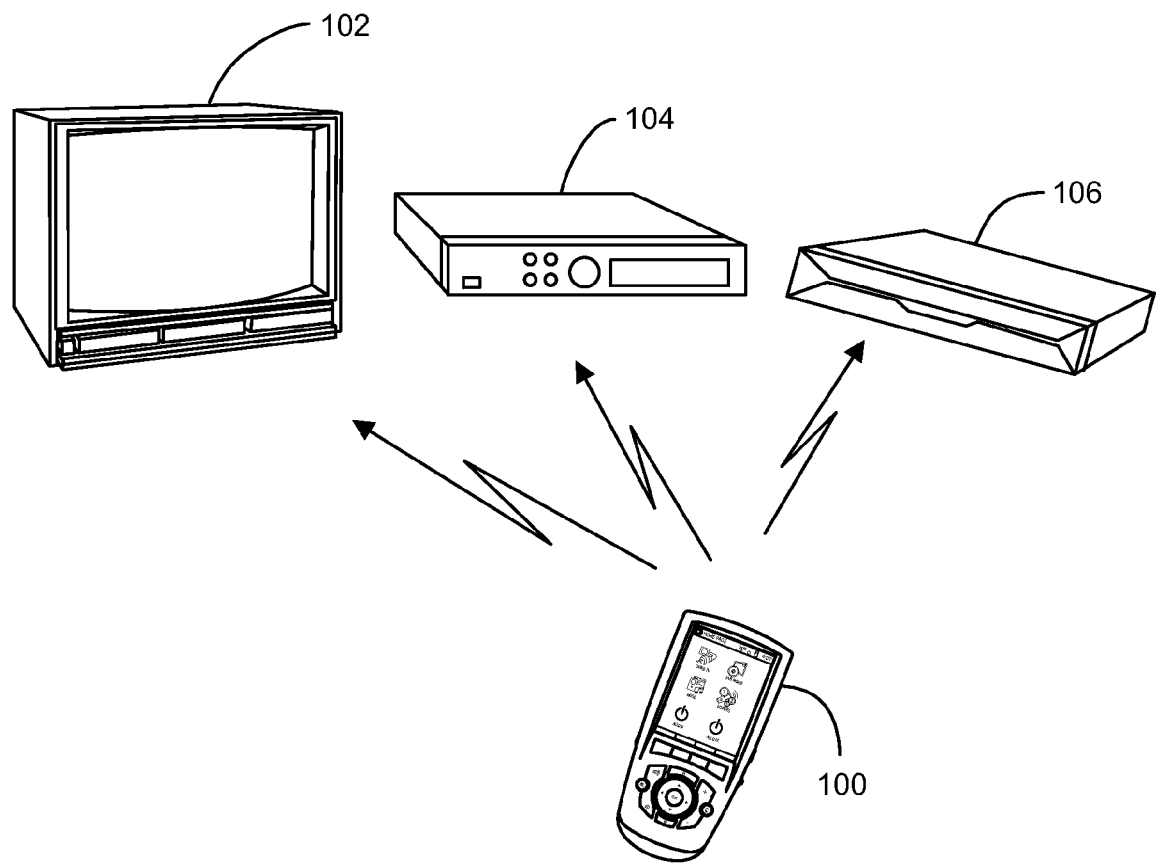
FIG. 1 illustrates an exemplary system in which an exemplary controlling device according to the instant invention may be used.

Turning now to FIG. 1, there is illustrated an exemplary system in which a to controlling device 100 is configured to control various controllable appliances, such as a television 102 and set top box ("STB") 104. As is known in the art, the controlling device 100 is capable of transmitting commands to the appliances, using any convenient IR, RF, Point-to-Point, or networked protocol, to cause the appliances to perform operational functions. While illustrated in the context of a television 102, STB 104, and DVR 106, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc.

Figure 3:
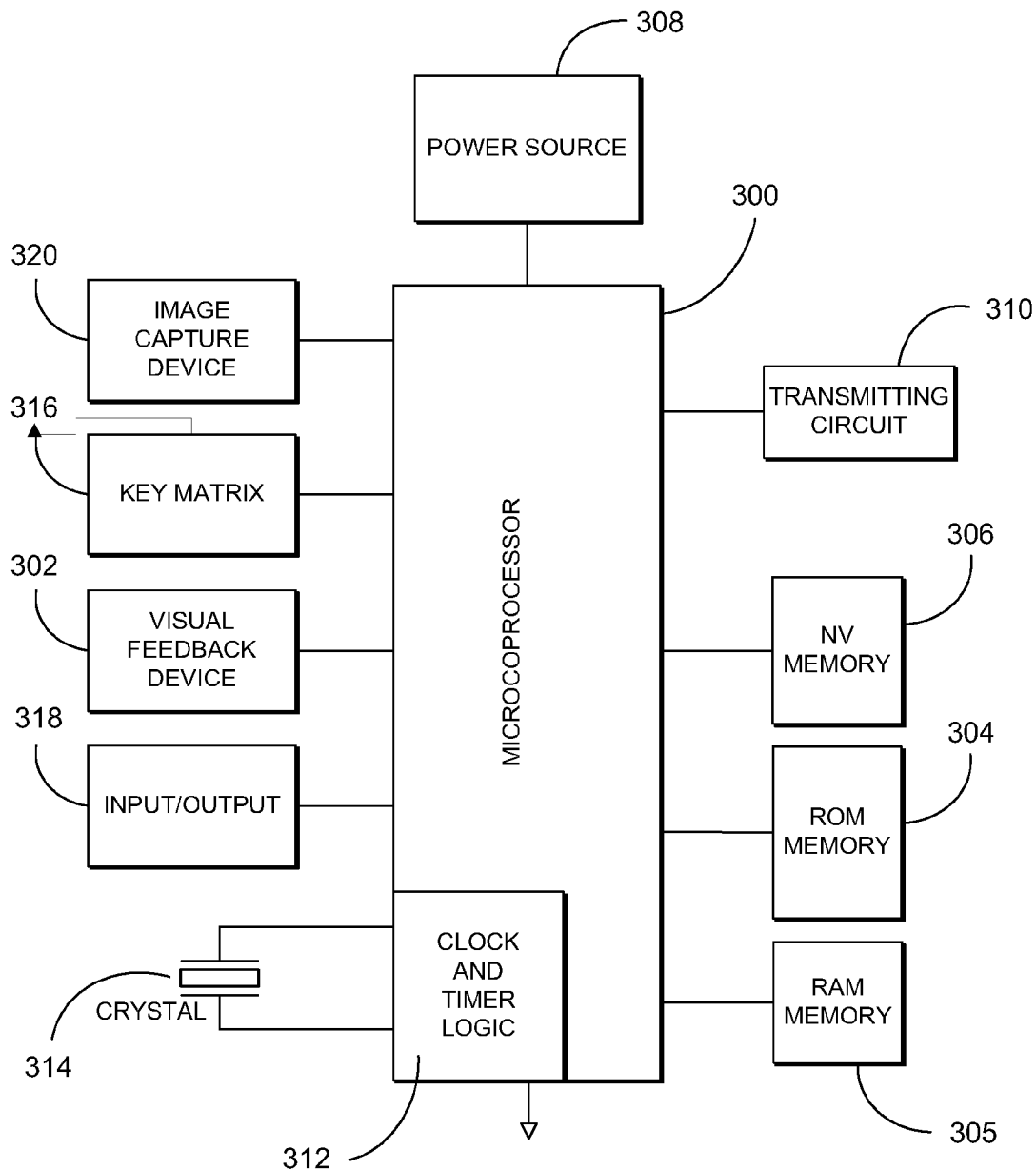
FIG. 3 illustrates exemplary components for use in the exemplary controlling device of FIG. 1.

With reference to FIG. 3, for use in commanding the functional operations of one or more appliances, the controlling devices 100 may include, as needed for a particular application, a processor 300 coupled to a ROM memory 304, a RAM memory 305, a key matrix 316 (e.g., hard keys, soft keys such as a touch sensitive surface overlaid on a liquid crystal (LCD), and/or an electroluminescent (EL) display), transmission circuit(s) 310 and/or transceiver circuit(s) (e.g., IR and/or RF), a non-volatile read/write memory 306, a means 302 to provide feedback to the user (e.g., One or more LEDs, display, speaker, and/or the like), a power source 308, an input/output port 318 such as a serial interface, modem, Zigbee, WiFi, or Bluetooth transceiver, USB port, etc., a digital image capture means such as a lens and associated CCD sensor 320, and clock and timer logic 312 with associated crystal or resonator 314.

As will be understood by those skilled in the art, some or all of the memories 304, 305, 306 may include executable instructions (collectively, the program memory) that are intended to be executed by the processor 300 to control the operation of the remote control 100, as well as data which serves to define the aforementioned control protocols and command values to the operational software (collectively, the command data). In this manner, the processor 300 may be programmed to control the various electronic components within the remote control 100, e.g., to monitor the power supply 308, to cause the transmission of signals, control the image capture means 320, etc. The non-volatile read/write memory 306, for example an EEPROM, batter-backed up RAM, FLASH, Smart Card, memory stick, or the like, may additionally be provided to store setup data and parameters as necessary. While the memory 304 is illustrated and described as a ROM memory, memory 304 can also be comprised of any type of readable media, such as ROM, FLASH, EEPROM, or the like. Preferably, the memories 304 and 305 are non-volatile or battery-backed such that data is not required to be reloaded after battery changes. In addition, the memories 304, 305 and 306 may take the form of a chip, a hard disk, a magnetic disk, an optical disk, and/or the like. Still further, it will be appreciated that some or all of the illustrated memory devices may be physically incorporated within the same IC chip as the microprocessor 300 (a so called "microcontroller") and, as such, they are shown separately in FIG. 3 only for the sake of clarity.

To cause the controlling device 100 to perform an action, the controlling device 100 is adapted to be responsive to events, such as a sensed user interaction with the key matrix 316, etc. In response to an event, appropriate instructions within the program memory (hereafter the "operating program") may be executed. For example, when a function key is actuated on the controlling device 100, the controlling device 100 may retrieve from the command data the command value and control protocol corresponding to the actuated function key and the current device mode, from memory 304, 305, 306 and transmit the to command to an intended target appliance, e.g., STB 104, in a format recognizable by that appliance. It will be appreciated that the operating program can be used not only to cause the transmission of command codes and/or data to the appliances, but also to perform local operations. While not limiting, local operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092. An additional local operation is the ability to "lock" function keys across device operational modes as described in U.S. Published Patent Application No. 2003/0025840.

Figure 2:
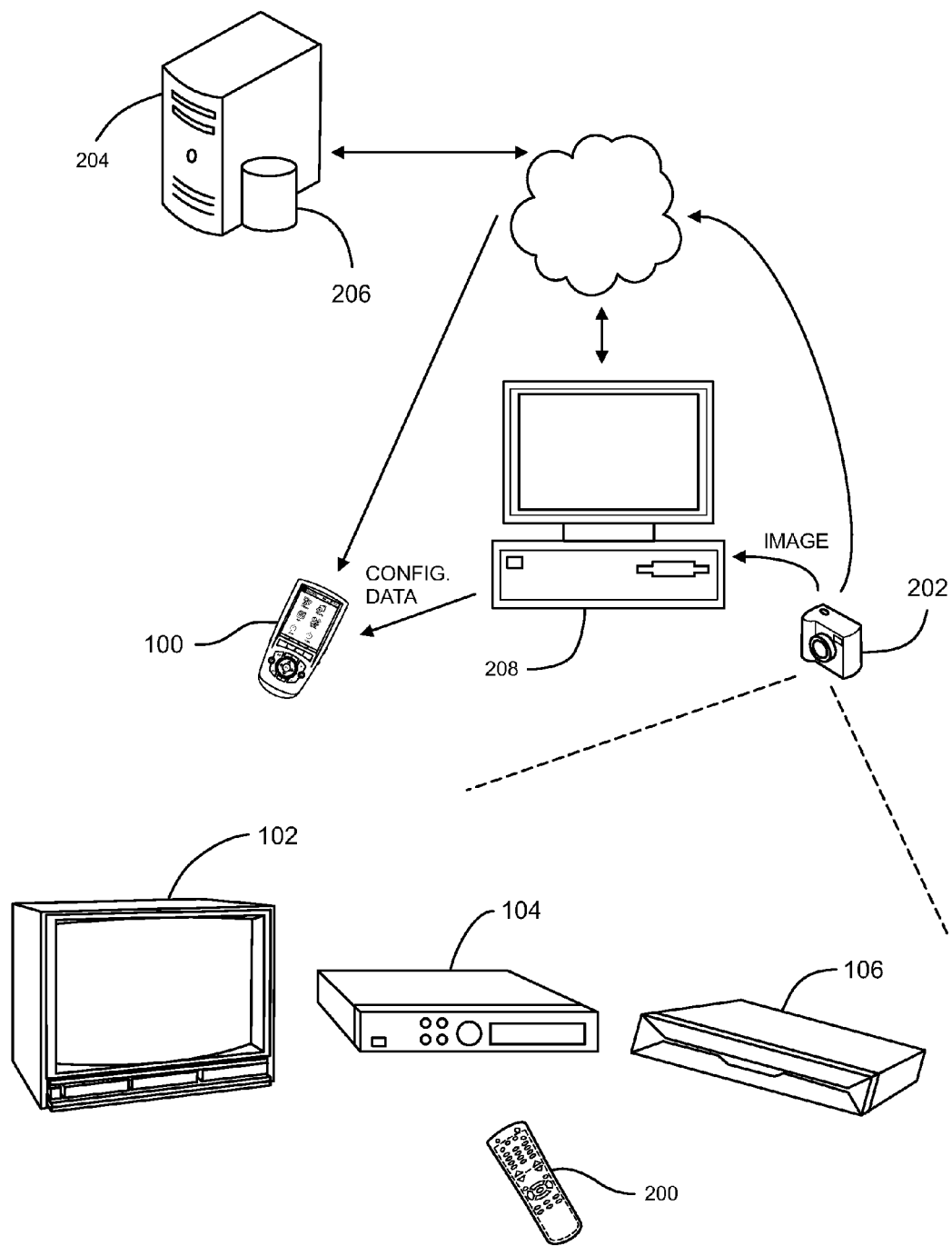
FIG. 2 illustrates an exemplary system in which an image is used to obtain configuration data for use in the exemplary controlling device of FIG. 1.
Figure 4:
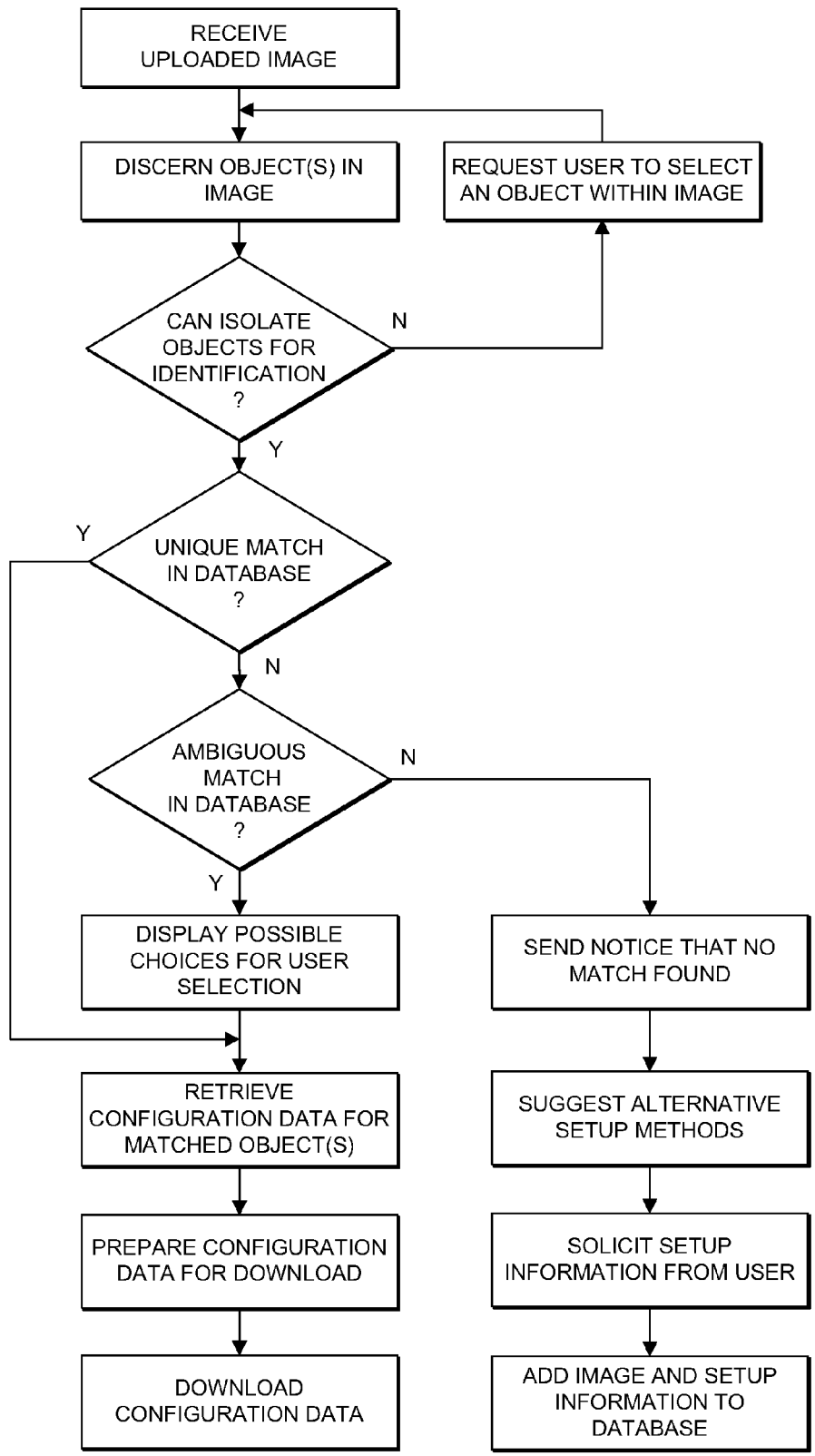
FIG. 4 illustrates an exemplary method for using an image to obtain configuration data for use in the exemplary controlling device of FIG. 1.

For configuring the controlling device 100 to command operations of one or more appliances, the system and method described hereinafter uses an image that is provided to the system for the purpose of identifying to the system the one or more appliance with which the controlling device 100 is to be used. As illustrated in FIGS. 2 and 4, an external image capturing device 202, such as a digital camera or any device with imaging capabilities, e.g., a cell phone, scanner, etc., may be used to capture an image that is to be uploaded to a system 204 having image recognition software and access to a database 206 of reference images that have been further cross-referenced to configuration data for appliances known to be represented by object(s) within the reference images. Alternatively, an image capture device 320 may be built into the remote control itself for this purpose.

Figure 5:
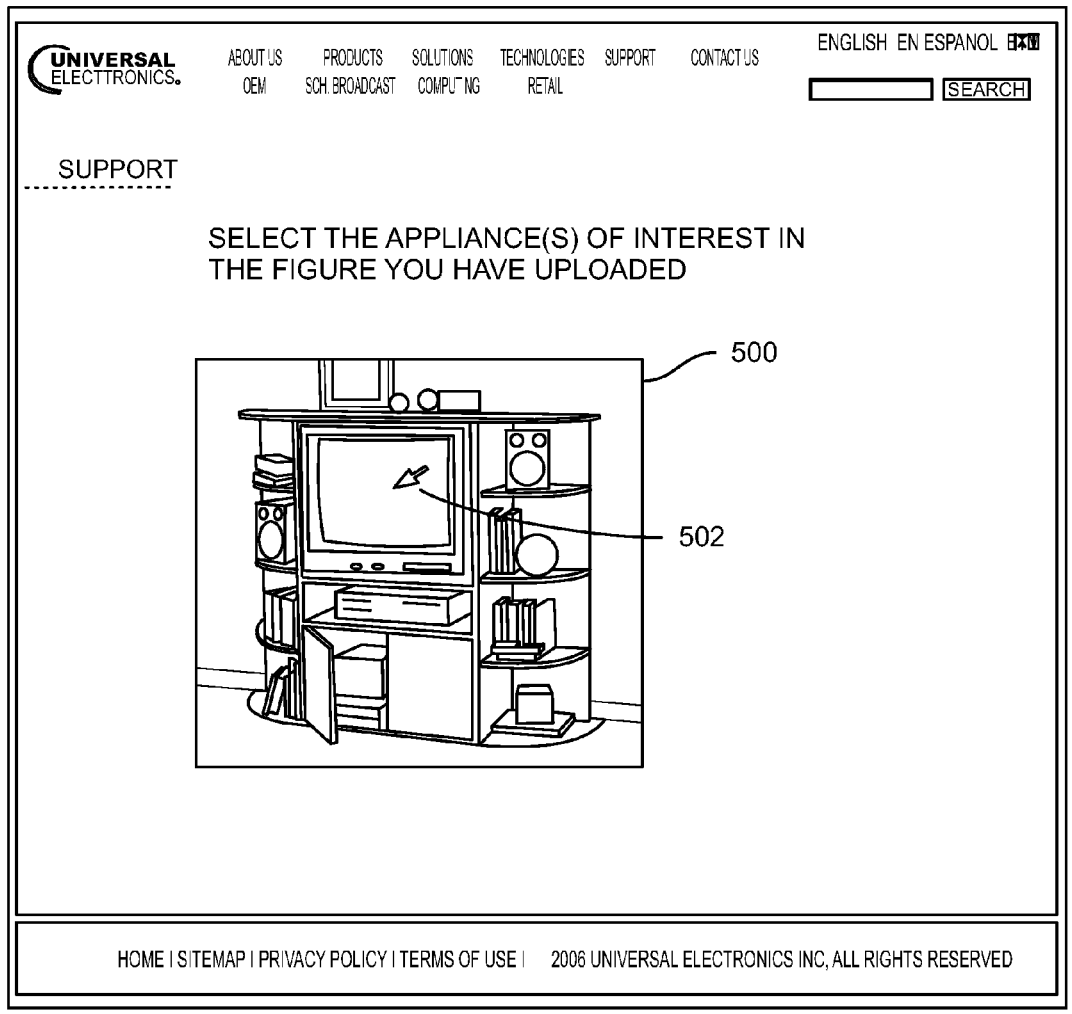
FIG. 5 illustrates a screen shot of a Web page by which a user may identify one or more objects within the image to be used to obtain configuration data for use in the exemplary controlling device of FIG. 1.
Figure 6:
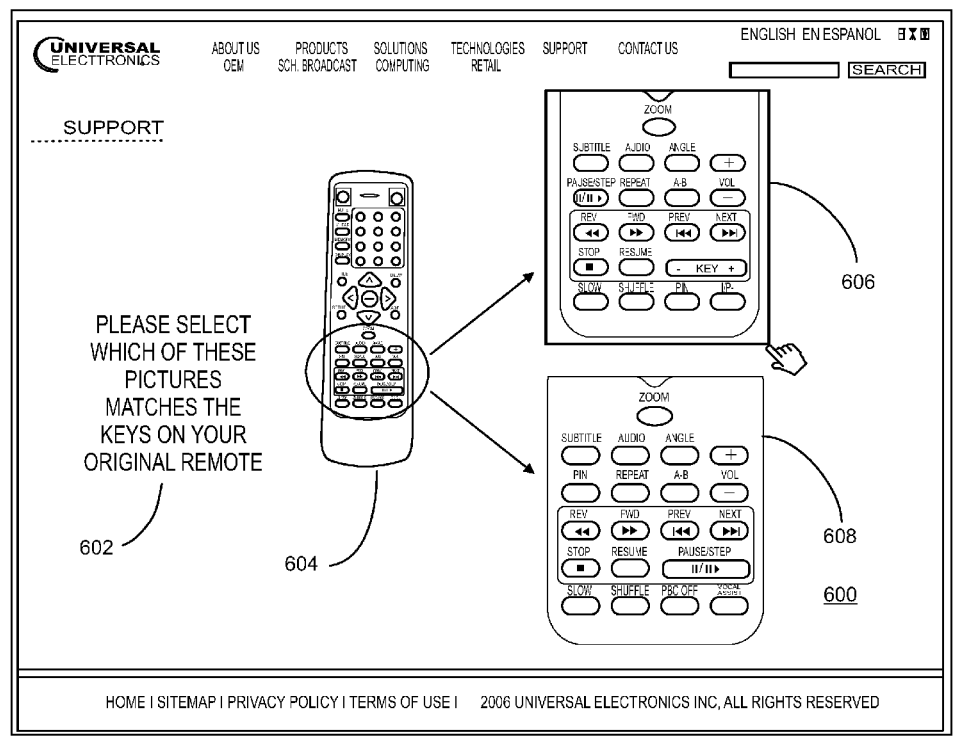
FIG. 6 illustrates a screen shot of a Web page by which a user may refine the identity of an original equipment remote control to obtain configuration data for use in the exemplary controlling device of FIG. 1.

In various embodiments the uploaded data may be an image or images of individual items, as illustrated for example by the remote control image 604 of FIG. 6, or may comprise a composite image of a group of items, as illustrated for example by the group of appliances to be controlled 500 of FIG. 5. In either event the system 204 functions to to discern from the information present in the image the one or more appliances to be controlled using the controlling device 100 to thereby select the appropriate configuration data that is to be used to configure the controlling device 100 to command operations of the appliances so discerned. Since the methods by which image recognition software may separate out (where necessary) and discern a match between one or more objects within an image and a corresponding object within a reference image are well known, for example being described in U.S. Pat. No. 6,952,496, 6,763,148, 6,115,495, or 5,263,098, these methods will not be described further herein for the sake of brevity. It is understood that one skilled in the art of image recognition processing algorithms, techniques, and methods may implement an imaging system as described herein using ordinary skill and without undue experimentation.

To provide the image to the system 204, the image may be uploaded from the external 202 or internal 320 image capture device directly to the system 204 via a network, such as the Internet or PSTN, and/or may be uploaded to the system 204 via an intermediate computer 208 which, in turn, is in communication with the system 204 via a network, such as the Internet or PSTN. In this context, uploading of image information to intermediate computer 208 may be wireless (e.g., via a WiFi local area network) or wired (e.g. via USB), and may occur in real time or off line, all without limitation. Similarly, the configuration data that is to be used to configure the controlling device 100 may be returned from the system 204 directly to the controlling device 100 via a network, such as the Internet or PSTN, and/or may be returned to an intermediate computer 208 via a network, such as the Internet or PSTN. At the intermediate computer 208, the configuration data may be simply downloaded to the controlling device 100 using the same or a different method as was used for uploading of the captured image and/or it may be used at the intermediate computer 208 in connection with a configuration building application resident of the intermediate computer 208 to thereby define a configuration which defined configuration may then be downloaded to the controlling device 100 as described in, for example, U.S. Published Application No. 2006/0050142. While the system 204 is illustrated as being a network server computer, it will be appreciated that elements described as being a part of the system 204 may be resident, in whole or in part, on a local computing device. Also, intermediate computer 208 may take the form of a conventional PC, a network gateway device, a cable, satellite, or IPTV set top box, etc., without limitation.

In an exemplary embodiment, it is contemplated that a user will access the system 204, for example by means of a Web browsing application, and will then upload an image to the system 204 that is intended to identify one or more appliances that the controlling device 100 is to be configured to control. To this end, the system 204 may provide guidance to a user by instructing the user to upload an image of an object that is likely to correspond to a reference object image stored in the database 206. By way of example and not intended to be limiting, the database 206 of the system 204 may have reference object images for original equipment remote controls (e.g., of remote control 200), appliances (e.g., of TV 102, VCR 104, PVR 106), appliance packaging, appliance barcodes, etc.

Once an image is uploaded to the system 204, the system 204 will use the image recognition software to attempt to discern a match between one or more objects in the uploaded image and the objects within the reference images stored in the database 206. In the event that the system 204 is unable to find a match for an object included in an uploaded image, the system 204 may notify the user that a match was not found and in cases where the uploaded image includes more than one object the system 204 may further display the uploaded image 500 and request that a user select object(s) within the image 500 that are to be reconsidered by the image recognition software as is illustrated in FIG. 5. In this case selection may be made by marking 502 one or more locations within the image 500, by drawing a boundary around one or more objects show in the displayed image 500, etc. and the system 204 may then use the marked part(s) of the uploaded image to reattempt to find a match between the selected object(s) and a reference image. Alternatively or in conjunction with the above, system 204 may cause to be displayed a representative sample of possible images from database 206, as further described hereafter in connection with FIGS. 6 through 8. In this regard, it is to be appreciated that these displayed images are considered to be a match with the uploaded image by the image recognition software on at least some level. The system 204 may also request that a user select one or more objects within an uploaded image prior to the image recognition software attempting to discern a match.

In the case where the image recognition software finds one or more matches for one or more objects within the uploaded image, the system 204 may display to the user the matched reference image(s) and/or appliance brand name, model (e.g., "the image indicates that the television is a Sony KV32HX15"), etc. and ask the user to confirm the match. In the case where multiple matches are found, the user may be asked to select one or more of the reference images as being the reference images for the appliances of interest to the user. By way of further example, FIG. 6 illustrates an exemplary Web page display 600 in which the image matching process of system 204 has determined that two possibilities exist for a submitted image 604. The distinguishing characteristics 606, 608 (button labels, in the example shown) may be highlighted to the user together with a request 602 to select which of the two pictures best matches the user's original equipment remote.

Figure 7:
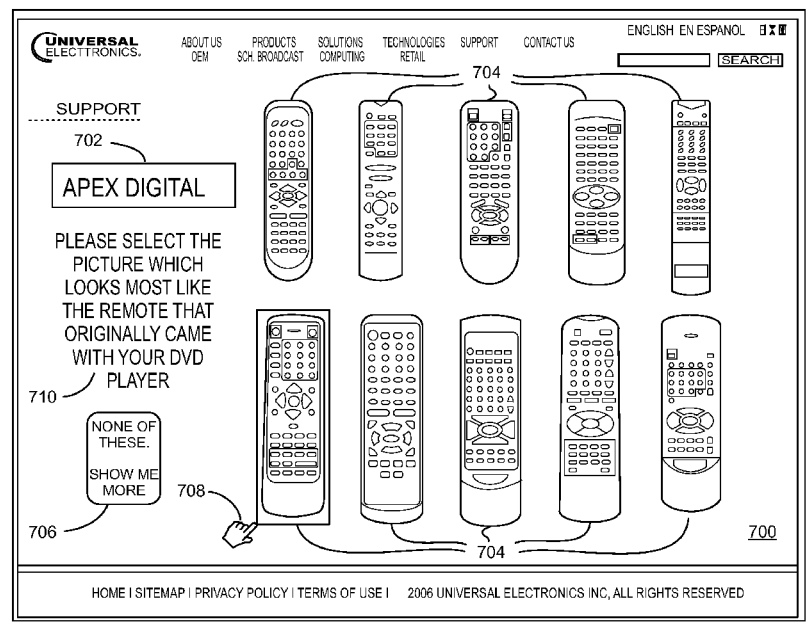
FIG. 7 illustrates a screen shot of a Web page by which a user may identify an original equipment remote control in order to obtain configuration data for use in the exemplary controlling device of FIG. 1.
Figure 8:
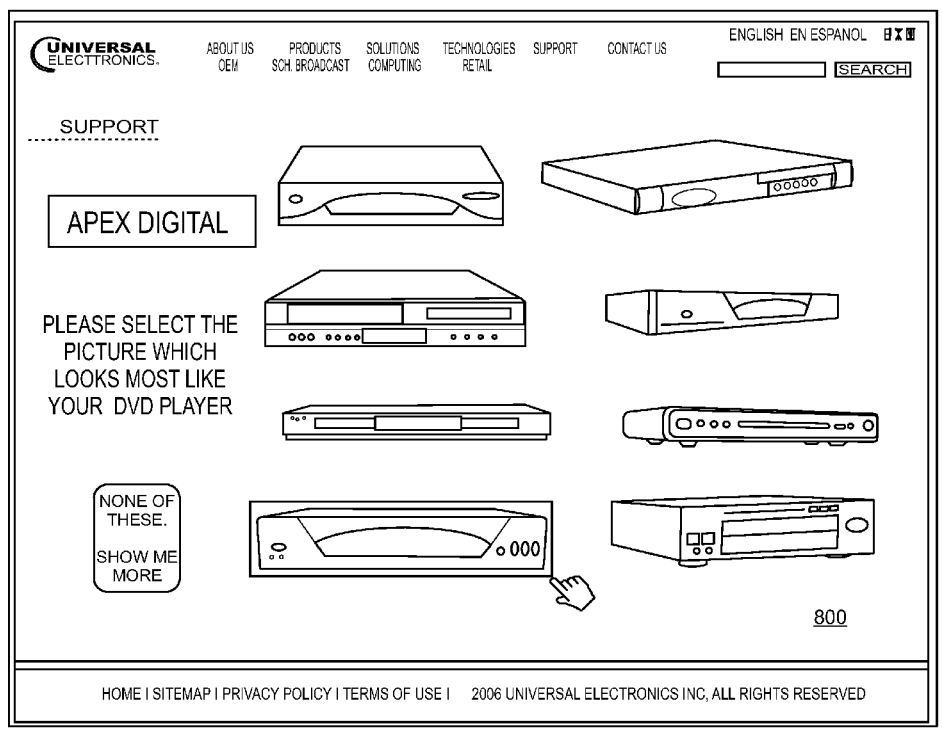
FIG. 8 illustrates a screen shot of a Web page by which a user may identify an appliance model in order to obtain configuration data for use in the exemplary controlling device of FIG. 1.

FIG. 7 illustrates an alternative method which may be used either in conjunction with that described above (for example, where a submitted image is of too low a quality to allow unambiguous matching) or independently (for example where a user does not have any image capturing means available). In this method, a user may supply basic selection criteria such as for example a brand name 702 and/or equipment type. System 204 may respond with a display 700 presenting a group of images 704 from database 206 all of which correspond to the supplied criteria, while prompting 710 the user to select the image which most closely resembles their item of equipment: in the example presented the original equipment remote control. Provision 706 may be made for more than one page of images. Additionally, it will be understood that selection of certain images, for example 708, may result in a further request as previously discussed in connection with FIG. 6. It will also be understood that although the example illustrated in FIG. 7 utilizes images of original equipment remote controls, other appropriate image sets, or mixtures of image sets may be used, for example images of the appliances themselves as illustrated in display 800 of FIG. 8, without limitation.

Once the system 204 has a confirmed match between reference image(s) within the database 206 and one or more objects within an uploaded image, whether system confirmed or user confirmed, the system 204 may then prepare the configuration data for the appliance(s) that have been cross-referenced to the matched reference image(s) for downloading. In this regard, the configuration data may be a complete command data set for an appliance(s), a pointer used to identify a command data set for an appliance(s) within a library of command data sets (e.g., a direct entry code for automatic or manual provision to the universal controlling device 100), a complete user interface (e.g., one or more user interface pages having one or more user interface elements), a pointer used to identify one or more user interface elements in a library of user interface elements, data for creating a new command data set for an appliance, data for creating a new function command for an appliance, etc. Further, upon confirmation system 204 may use any uploaded image data to supplement or refine reference image database 206 in order to improve future performance.

In the case where multiple appliances have been identified to the system 204, whether in a single picture or by tracking past user uploads and identifications, the system 204 may prepare one or more macros for commanding the operations of the known appliances for possible inclusion in the controlling device 100, as described in U.S. application Ser. No. 10/411,792, e.g., to turn on a television, tune a television to a particular channel, turn on a DVD player, turn on a home theater audio system, etc. Similarly, the configuration data may include programming for establishing user interface pages, such as a page which presents user interface elements for use in controlling the multiple, identified appliances as described in U.S. Published Application No. 2006/0050142.

As further illustrated in FIG. 2, the configuration data for the identified appliance(s) may be downloaded directly to the controlling device 100 whereupon the programming of the controlling device 100 may use the data to automatically configure the controlling device 100 to communicate command(s) to the appliance(s) so identified from the uploaded image by the system 204. As additionally noted, the programming of the controlling device 100 may also use downloaded configuration data to automatically configure the user interface of the controlling device to provide a means for a user to cause the controlling device 100 to communicate the command(s) to the appliance(s) so identified. By way of example and not intended to be limiting, the downloaded data may cause the controlling device 100 to select from a pre-stored library of command data sets a command data set to be used in transmitting commands to an appliance identified by the uploaded image, may cause the controlling device 100 to store and use a complete data set for an appliance identified by the uploaded image, may cause the controlling device 100 to select from a pre-stored library of user interface elements a user interface element to be interacted with to cause the controlling device IOU to transmit a command to an appliance identified by the uploaded image, etc.

As also illustrated in FIG. 2, the configuration data may be downloaded to an intermediate computer 208. The configuration data may then be downloaded to the controlling device 100 when the controlling device 100 is placed into communication with the intermediate computer 208 where the programming of the controlling device 100 may use the configuration in the manner discussed above as if it had been provided to the controlling device 100 directly. Still further, the intermediate computer 208 may use the configuration data to for example, display keystrokes that are to be entered via the key matrix of the controlling device 100 to configure the controlling device to communicate commands to an appliance identified by the uploaded image and/or to configure the user interface used to initiate the transmission of command(s) to an appliance identified by the uploaded image. Yet further, the intermediate computer 208 may have programming that uses the configuration data, whether it be a downloaded, full command code set or a pointer to a command code set and/or user interface elements accessible to the intermediate computer 208, to allow for the creation of a configuration that is to be ultimately downloaded into the controlling device, as disclosed in, for example, U.S. Pat. No. 6,211,870 or U.S. Published Patent Application No. 2006/0050142.

In an embodiment in which controlling device 100 includes a touch screen display, should system 204 be unable to match an uploaded image of an original equipment remote control to any item in reference database 206, the captured image may be displayed on the face of controlling device 100 and used as a button template to guide a user in "learning" the functions of the original equipment remote control, as described for example in PCT published patent application WO 2005/043484. It will be appreciated that in this event, upon completion of the teaching process the learned command data as well as mappings between the command data and keys of imaged remote control may be subsequently uploaded to system 204 for storage together or in association with the previously unmatched image. Such uploaded learned data may then be used directly as, or as a cross-reference to, configuration data for use in connection with future matches to that image.

While various concepts have been described in detail, it will be appreciated by those skilled in the art that various modifications and alternatives to those concepts could be developed in light of the overall teachings of the disclosure. For example, while one disclosed exemplary embodiment contemplates delivery of configuration data key-in sequences via the Internet or similar interactive electronic means, it will be appreciated that in alternative embodiments these may be delivered to a customer verbally over the telephone by a service representative or an automated dial-in service, mailed to a customer either electronically or by way of the postal service, published on a community bulletin hoard, electronic or otherwise, etc., all without departing from the spirit of the invention. It will also to be appreciated that the database and system for performing image recognition may be logically and/or physically distinct from the database and system ultimately used to provide configuration information and data for the controlling device—for example an image recognition system may discern and identify an appliance by its model number, which model number may then be subsequently supplied to a separate system which utilizes the identified model number as an index into a database of device setup information and/or downloadable control codes. Further, while various aspects of this invention have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for providing a universal controlling device with a configuration information to enable the universal controlling device to communicate commands to one or more target appliances, comprising:

uploading to an image recognition system, having an associated database of images that are cross-referenced to configuration information for a plurality of appliances, an image and one or more command codes learned from a controlling device;

storing the uploaded image in the database of images associated with the image recognition system;

cross-referencing to the uploaded image as configuration information at least the one or more uploaded command codes learned from the controlling device;

in response to a request to the image recognition system to receive configuration information, which includes a single image and a user provided designation of at least one target appliance within the single image that the image recognition system discerns to be a match for the uploaded image, providing for use in configuring the universal controlling device the configuration information cross-referenced to the uploaded image and a macro command code for commanding multiple operations of one or more appliances including the target appliance in response to activation of a single input provided to the universal controlling device.

2. The method as recited in claim 1, wherein the uploaded image represents the controlling device from which the command codes were learned.

3. The method as recited in claim 2, comprising uploading to the image recognition system a mapping between the one or more command codes and keys of controlling device from which the command codes were learned and including the mapping as part of configuration information cross-referenced to the uploaded image.

4. The method as recited in claim 3, comprising using a controlling device having a camera and programming for learning command codes to capture an image of the controlling device and to learn the one or more command codes from the controlling device.

* * * * *